J. S. Wertz.
Earth Auger.

N° 24,682.   Patented Jul. 5, 1859.

Witnesses:   Inventor;

UNITED STATES PATENT OFFICE.

JOHN S. WERTZ, OF MIDDLETOWN, IOWA.

MACHINE FOR BORING POST-HOLES IN THE EARTH.

Specification of Letters Patent No. 24,682, dated July 5, 1859.

*To all whom it may concern:*

Be it known that I, JOHN S. WERTZ, of Middletown, in the county of Des Moines and State of Iowa, have invented a new and Improved Machine for Boring Holes in the Earth to Receive Fence-Posts; and I do hereby declare that the following is a full, clear, and exact description of the same, reference being had to the annexed drawings, making a part of this specification, in which—

Figure 1:
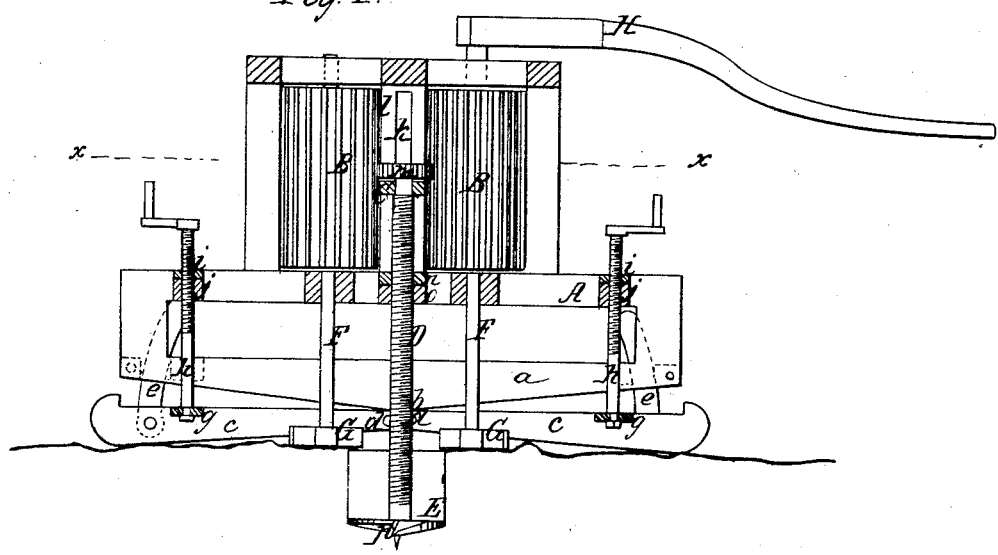
Figure 2:
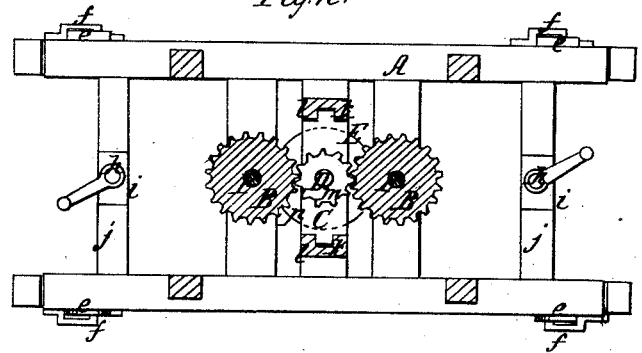

Figure 1, is a side view of the working parts of my invention the frame being bisected vertically and centrally. Fig. 2, is a horizontal section of do., taken in the line $x, x$, Fig. 1.

Similar letters of reference indicate corresponding parts in the two figures.

To enable those skilled in the art to fully understand and construct my invention I will proceed to describe it.

A, represents a frame which may be of rectangular form, the under sides of the sills $a, a$, of which may be beveled or inclined upward from their centers $b$, as shown clearly in Fig. 1. To the under side of each sill $a$, and at its center $b$, two bars $c, c$, are attached by joints $d, d$. These bars extend to the ends of the sills and are adjustable up and down in the same plane with the sills. To the outer end of each bar $c$, a curved or sector bar $e$, is attached. These bars work in guide loops $f$, attached to the outer sides of the sills. The outer parts of the bars $c, c$, at each end of the frame are connected by cross bars $g$, in each of which the lower end of a rod $h$, is attached, and allowed to turn freely. These rods have screw threads cut or formed on them and they pass through nuts $i$ in cross bars $j$, at the upper part of the frame A. By turning the rods $h$, the frame may be beveled when on uneven ground, and by using four rods, one for each bar $c$, the frame may be adjusted both laterally as well as longitudinally;—this latter arrangement would be preferable although two rods are only shown in the drawings.

On the upper part of the frame A, two vertical toothed cylinders B, B, are placed, and between the two cylinders a cross bar or head C, is placed and allowed to slide freely up and down in grooves $k$, in the inner sides of vertical bars of the frame.

D, is a vertical screw shaft, which is placed between the cylinders B, B, and has its upper end passing through the cross head C, with a pinion $m$, secured to it, which pinion gears into the cylinders B, B, as shown clearly in both figures. The screw shaft passes through a nut $u$, which is fitted in a crosspiece $o$, of the frame A, and to the lower end of the screw shaft D, an auger E, is attached, said auger being formed of a hollow cylinder open at the top with bits $p$, formed, at its lower end, the bits extending from the shaft to the periphery of the cylinder.

The shaft F, of each cylinder B, extends down below the frame A, and each shaft has a scraper G, attached. These scrapers are merely blades or arms which project from opposite sides of the shafts F, the plane of their rotation just touching or intersecting that of the auger E. The shaft F, of one of the cylinders B, has a sweep H, attached to its upper end.

The operation is as follows: The frame A, is adjusted in a horizontal position by turning the rods $h$, as previously described, the auger E, being over the spot where the post hole is to be sunk. The horse is then attached to the sweep H, and the cylinders B, B, and screw shaft D, rotated by the revolutions of the sweep, the shaft D, being rotated in consequence of its pinion $m$, gearing into the cylinders. The auger E, as the shaft D, rotates bores into the earth as the auger is fed down to its work by the nut $n$, and the earth passes up through the interior of the auger and is swept or scraped away from the orifice at the surface by the revolution of the scrapers G, G.

The cylinders B, B, it will be seen, must be sufficiently long to allow the auger to penetrate the earth a distance equal to the desired depth of the post holes. The frame may be readily drawn from place to place and adjusted at the spots where the holes are to be sunk, and the holes may be sunk in a rapid manner. The whole device is simple and may be constructed at a reasonable cost.

Having thus described my invention what I claim as new and desire to secure by Letters Patent, is,

1. The arrangement and combination of the screw-shaft D, crosshead C, grooves (*k*) pinion (*m*) and toothed cylinders B, as and for the purpose herein shown and described.

2. The arrangement and combination with the cylinders B, of the shafts F, and rotary scrapers G, as and for the purpose herein shown and described.

3. The arrangement and combination with the frame A, of the jointed bars (*c, c*) sectors (*e*) and adjusting rods (*h*) as and for the purpose herein shown and described.

JOHN S. WERTZ.

Witnesses:
W. THOMPSON,
SOL. E. START.